United States Patent
Schoene

(10) Patent No.: US 11,846,501 B2
(45) Date of Patent: Dec. 19, 2023

(54) METHOD FOR DETECTING THE SURFACE PROPERTIES OF COMPONENTS, USE OF THE METHOD FOR MONITORING THE SURFACE QUALITY OF COMPONENTS AND DEVICE FOR ADJUSTING THE SURFACE PROPERTIES OF COMPONENTS

(71) Applicant: Henkel AG & Co, KGaA, Duesseldorf (DE)

(72) Inventor: Jens Roland Schoene, Neufahrn (DE)

(73) Assignee: Henkel AG & Co. KGaA, Duesseldorf (DE)

( * ) Notice: Subject to any disclaimer, the term of this patent is extended or adjusted under 35 U.S.C. 154(b) by 83 days.

(21) Appl. No.: 17/343,013

(22) Filed: Jun. 9, 2021

(65) Prior Publication Data

US 2021/0293536 A1 Sep. 23, 2021

Related U.S. Application Data

(63) Continuation of application No. PCT/EP2019/083019, filed on Nov. 29, 2019.

(30) Foreign Application Priority Data

Dec. 13, 2018 (EP) .................................. 18212355

(51) Int. Cl.
  *G01B 11/30* (2006.01)
  *B23P 19/04* (2006.01)
  *G01J 5/00* (2022.01)
  *G01J 5/02* (2022.01)

(52) U.S. Cl.
  CPC .............. *G01B 11/30* (2013.01); *B23P 19/04* (2013.01); *G01J 5/0003* (2013.01); *G01J 5/0275* (2013.01); *G01J 2005/0077* (2013.01)

(58) Field of Classification Search
  CPC ........ G01B 11/30; B23P 19/04; G01J 5/0003; G01J 5/0275; G01J 5/025; G01J 2005/0077
  See application file for complete search history.

(56) References Cited

U.S. PATENT DOCUMENTS

| | | | | |
|---|---|---|---|---|
| 4,759,072 A | * | 7/1988 | Yamane | .................. G01N 21/89 250/559.46 |
| 6,452,180 B1 | * | 9/2002 | Nistler | .................... G01N 21/71 250/341.4 |
| 9,387,527 B2 | * | 7/2016 | Nishiura | ................. G01K 1/026 |
| 2010/0095722 A1 | * | 4/2010 | Nishiura | ................... B21B 1/26 72/12.2 |

FOREIGN PATENT DOCUMENTS

JP S60179638 A 9/1985

OTHER PUBLICATIONS

International Search Report for PCT/EP2019/083019 dated Feb. 18, 2020.

* cited by examiner

*Primary Examiner* — Bayan Salone
(74) *Attorney, Agent, or Firm* — Mary K. Cameron

(57) ABSTRACT

A method for detecting differences in surface properties of one or more components is provided wherein the infrared radiation emitted by the component at a specific temperature of the component is detected as irradiance on a selected receiver surface relative to the component. When detecting at different positions or on a plurality of components, the solid angle covered by the receiver surface and the distance from the component surface is almost unchanged and differences in the detected irradiance can then be equated with differences in the surface properties of the components. The invention further relates to use of such methods for monitoring and optionally adjusting the surface quality of a component, as well as to a device for adjusting the surface properties in the series production of components.

22 Claims, No Drawings

METHOD FOR DETECTING THE SURFACE PROPERTIES OF COMPONENTS, USE OF THE METHOD FOR MONITORING THE SURFACE QUALITY OF COMPONENTS AND DEVICE FOR ADJUSTING THE SURFACE PROPERTIES OF COMPONENTS

The present invention relates to a method for detecting differences in the surface properties of one or more components, in which method the infrared radiation emitted by the component at a certain temperature of the component is detected as irradiance at a specified receiver surface relative to the component. When detecting at different positions or on a plurality of components, it is ensured that the solid angle covered by the receiver surface and the distance from the component surface is almost unchanged. Differences in the detected irradiance can then be equated with differences in the surface properties of the components. In further aspects, the present invention includes the use of such methods according to the invention for monitoring and optionally adjusting the surface quality of a component originating from a manufacturing process, as well as a device for adjusting the surface properties in the series production of components.

The surface properties of materials often play a key role in the manufacturing process for the production thereof or in downstream production processes that use this material. This is primarily the case when bonding or sealing metal materials, since the adhesion of the adhesives and sealants to the material depends decisively on the properties of the metal surface. Corrosion products or residues from previous manufacturing steps can negatively affect the adhesion to the metal surfaces. Monitoring the surface quality is therefore an integral part of quality assurance in the integral joining of materials of all kinds, both during and immediately after a manufacturing process for providing a semi-finished product or a finished component. By determining the surface properties of the materials used in the production of complex components in a timely manner, i.e., close to production, the manufacturing process can be adapted; for example, targeted measures for surface treatment can be initiated in order to eliminate surface properties of a material that are otherwise disadvantageous for the manufacturing process. Although there is an almost unmanageable number of surface analytical methods in the prior art, there is still a need to provide methods that allow the surface properties of materials to be monitored during the further refinement thereof, whether this be by molding, joining, sealing or coating, i.e., during a manufacturing process. An object of the present invention is to establish a method which makes it possible to assess the surface properties of materials, in particular metals, within a few seconds or at best fractions of a second, which method also works non-destructively and without contact and does not require the material to be examined to be temporarily removed from the actual manufacturing process. A main goal is to be able to determine or recognize differences in the surface properties in order to be able to draw a conclusion regarding the properties of a surface area of the material. Established non-destructive surface analysis methods such as X-ray fluorescence, energy-dispersive X-ray spectroscopy or X-ray photoelectron spectroscopy are vacuum technologies and therefore generally not suitable for capturing the surface quality of a material in an industrial manufacturing process.

The invention described herein makes use of the property of materials to emit electromagnetic radiation in the infrared range, where, insofar as differences in the emissivity of a surface of an individualized component are determined or made visible, these differences correspond to differences in the surface properties of the component.

The physical phenomenon whereby every material has a substance-specific emissivity is of course well known, but this material property has so far been primarily determined only for contactless temperature measurement and not for clarifying and assessing the material surface properties of a material surface.

The problem addressed by the invention is therefore solved by a method for detecting differences in the surface properties of a component, in which method the infrared radiation emitted by the component at a certain temperature of the component is detected as irradiance at a specified receiver surface at at least two different positions relative to the component, the positioning being carried out in such a way that the distance of three fixed points on the receiver surface from the component surface remains substantially unchanged along the surface normals thereof for each position of the receiver surface, the position dependency of the detected irradiance being equated with differences in the surface properties of the component.

The term "component" includes any solid made from a material or a combination of materials and thus also semi-finished products, which in turn are subjected to further manufacturing steps for the production of more complex components, for example by reshaping and integrally joining by bonding or sealing.

The "receiver surface" can be flat or curved; preferably it is flat or designed as a spherical surface having a solid angle of less than $2\pi$ sr. When designed as a spherical surface, the receiver surface according to the present invention can also consist of a plurality of flat partial surfaces, the surface normals of which point to a common fixed point. Within the scope of the present invention, a receiver surface is suitable for converting the infrared radiation incident thereon in a specified wavelength range or at a specified wavelength into a physical signal that is proportional to the radiant flux recorded on the receiver surface, i.e., the irradiance in the specified wavelength range or at the specified wavelength. The irradiance, also called radiance flux density in technical linguistic usage, corresponds to the radiant flux detected by the receiver surface. It has the unit watt per square meter. Accordingly, it is preferred according to the invention if the receiver surface for detecting the irradiance is the light-sensitive surface of a pyroelectric sensor (also called a PIR sensor) and is thus made of a pyroelectric material, the specification of which in turn depends only on the selection of the preferred infrared wavelength range over which the irradiance by the receiver surface is to be detected. Depending on the wavelength dependency of the emissivity of the material of the component and the surface components or the infrared permeability of any thin layers on the component, it can be advantageous to select a specific wavelength range for the detection of the irradiance and thus also a specific PIR sensor. Usually, and therefore preferably, the infrared radiation emitted by the component is detected over a wavelength range or at a wavelength which is in the range of from $1.0\times10^{-6}$ to $1.0\times10^{-4}$ m, particularly preferably in the range of from $3.0\times10^{-6}$ to $2.0\times10^{-5}$ m.

In order to determine differences in the surface properties of a component, it is necessary that the irradiance is detected at at least two positions relative to the component. The detection at at least two positions can take place simultaneously or at different times; if the detection is carried out simultaneously, an array of receiver surfaces is usually used, the surface normals of which surfaces are preferably not convergent in the geometric center of gravity and particularly preferably extend parallel to one another, for example when detecting the infrared radiation emitted by a flat partial surface of the component.

If the position of the receiver surface relative to the component changes when the irradiance is detected such that the distance thereof from the component surface varies, strictly speaking there is no longer any correlation between the irradiance and the surface properties at otherwise the same temperature. According to the invention, it is therefore necessary that the distance of three fixed points on the receiver surface from the component surface along the surface normals thereof remains substantially unchanged for each position of the receiver surface during the detection of the irradiance. A fixed point on the receiver surface is a clearly defined location point within the two-dimensional configuration of the receiver surface. The relevant position of the receiver surface relative to the component is considered substantially unchanged in this regard if the distance of the fixed points from the component surface during detection at different positions above the component deviates in each case from the arithmetic mean of the spacing by no more than 20%, preferably by no more than 10%, particularly preferably by no more than 5%, very particularly preferably by no more than 2%.

To show the differences in the surface properties of the component, it is preferred that the position dependency of the detected irradiance is converted into a location dependency on the surface of the component. This is achieved in that the location of the geometric center of gravity of the receiver surface in the particular position at which the irradiance is detected is projected onto the surface of the component along the surface normal in the geometric center of gravity. Via the location projected onto the surface of the component in this way, the detected irradiance is correlated with a location on the surface of the component being examined. Furthermore, it is then preferred according to the invention for the representation of the differences in the surface properties that a location-dependent mapping of the surface of the component takes place by detecting the irradiance on the receiver surface at a large number of different positions relative to the component, with all positions or the three fixed points on the receiver surfaces then preferably being in three mutually parallel surfaces, which in turn are congruent to the topography of the surface of the component, thus ensuring that the detected irradiance occurs with the same spacing and orientation of the receiver surface to the mapped surface of the component.

In a preferred embodiment of the method according to the invention, the position dependency or location dependency of the detected irradiance is shown by means of false color imaging. In this way, the differences in the surface properties are visible to a person skilled in the art at a glance. This can be advantageous in the case of random monitoring of the surface properties in the series production of components, or even if a visual representation of the surface properties of an individualized component is to be provided on request during otherwise purely computer-aided monitoring.

Especially when mapping the surface properties or generally when determining the surface properties of a large number of similar components, e.g., in quality monitoring of a series production, it can be advantageous if, in order to detect the irradiance at a specified temperature of the component or components that is constant over all determinations, the temperature of the component or components is determined by means of a temperature sensor, the component or components preferably being connected to a heat source or sink for setting a specific temperature. In this way, it is possible to passively determine whether the temperature is constant and optionally to regulate the temperature constant for a predefined temperature, which is possibly particularly suitable for determining the surface properties of a certain component. The temperature at which the irradiance is detected is not specified in the method according to the invention and can assume any value. A temperature range of −10 to 300° C. is relevant in practice.

In this context, in the method according to the invention it is particularly easy to analyze surfaces of components which dissipate thermal energy well and do not tend to compensate for temperature differences in the component only very slowly. It is therefore preferred that the component has a thermal conductivity of at least 1 $Wm^{-1}K^{-1}$ and is particularly preferably metal and is particularly preferably made of a metal material selected from tin, titanium, aluminum, magnesium, iron, zinc, chromium, nickel or copper and the alloys thereof. The latter selection concerns metals that form native oxide layers and are subject to corrosion processes, so that the surface properties thereof in the industrial production of components that comprise these materials are usually of great importance for functionality or further processing, e.g., in bonding and joining processes, of the component. In the context of the present invention, the term "metal component" also includes metal coatings on metal or non-metal substrates, for example nickel-plated acrylonitrile-butadiene-styrene or galvanized or aluminized (=aluminized) steel strip.

In a particular embodiment of the method according to the invention, differences in the surface properties of a preferably metal component are determined on a coated component or a component having a wet film, the coating or wet film being substantially transparent in the detected wavelength range or at the particular detected wavelength. A coating or a wet film is substantially "transparent" if the wavelength-dependent absorption in the coating or in the wet film is measured using ATR infrared spectroscopy at an angle of incidence of 450 after background compensation and Savitzky-Golay correction in the particular wavelength range or at the particular wavelength is less than 30%, preferably less than 20%.

In a variant of the method described above, the detected irradiances are also correlated with those that are emitted and detected in the same way by other components made of the same material having standardized or known surface properties. It is thus possible to show the degree of deviation or identity of the surface properties of components with a desired reference value. The present invention also relates to a method for detecting differences in the surface properties of at least two components made from the same material, in which method the infrared radiation emitted by the components at a certain temperature of the relevant component is detected as irradiance at a specified receiver surface at at least one different position relative to each individual component, which method is characterized in that the irradiance emitted by each individual component is always detected in such a way that the distance of three fixed points on the receiver surface from the particular component surface along the surface normals thereof at the at least one position of the receiver surface relative to the particular component, as well as the temperature of each individual component, remains substantially unchanged, with differences in the irradiance of the components detected on the receiver surface being equated with differences in the surface properties of the components. The temperature during the detection of the infrared radiation emitted as irradiance of each component is substantially unchanged if the deviation from the arithmetic mean is less than 20%, preferably less than 10%, particularly preferably less than 5% and very particularly preferably less than 2%.

In a further aspect, the present invention relates to the use of one of the two previously described methods according to the invention, including the preferred embodiments presented in connection with these methods, for monitoring and optionally setting the surface quality of a component originating from a manufacturing process. For this purpose, the method is preferably carried out such that the actual value of the surface quality is initially equated with the irradiance detected using one of the two methods described above, which is emitted as infrared radiation from a component, and then is compared with the identically detected irradiance, as a target value of the surface quality, of an identical component which has a desired surface quality and the component or components is/are checked with regard to a predetermined tolerance for the deviation from the target value and actual value and classified qualitatively. The irradiance between two different components is detected identically when identical receiver surfaces are used for this purpose and the distance of three fixed points on the receiver surface from the particular surface of the component along the surface normals thereof at the position of the receiver surface at which the irradiance is detected relative to the particular component, as well as the temperature of each individual component, remains substantially unchanged. The temperature and spacing of the fixed points from the surface of the component is substantially unchanged if the deviation from the arithmetic mean of the temperature and the spacing, respectively, at each fixed point is less than 20%, preferably less than 10%, particularly preferably less than 5% and very particularly preferably less than 2%.

The actual value of the surface quality of the component is preferably determined at a temperature of the component in the range of from −10 to 300° C., particularly preferably at a temperature at which the chemical surface condition of the component does not undergo any transformation, e.g., scaling or crystallization, and at the same time the differences in the emissivity of the surface conditions are maximal. A person skilled in the art can therefore, depending on the material of the component and the question of the surface condition, make a preselection for the temperature of the component or components at which the irradiance is to be detected.

The methods for determining differences in the surface properties of components are preferably used according to the invention in order to determine the quality of a material surface in series production and optionally to channel individual components out of the manufacturing process or to treat them individually so that the desired quality is achieved, or, in at least one of the production stages preceding the determination of the surface quality, to adjust the process so that the desired surface quality is restored in series production.

A use according to the invention is therefore preferred in which the component is subjected to a surface treatment if the actual value of the surface quality deviates from the target value thereof, which is no longer within the specified tolerance, and optionally the deviation from the actual value of the surface quality from the target value thereof is determined again, and the surface treatment process is repeated until the actual value of the surface quality is within the specified tolerance. A suitable application is integral connection by bonding or sealing components. For sufficient adhesion to the components to be bonded, it is usually important that the component surfaces have suitable surface properties and metal components are, for example, free of rust and organic contaminants such as forming oils before they are brought into contact with the adhesive or sealant for a permanent integral connection. Here it may be necessary for individual components to undergo cleaning again until the desired surface condition, as detected according to the invention, is produced.

Alternatively, in the case of series production of components comprising a large number of process steps, a use according to the invention is preferred in which, if the actual value of the surface quality on a component deviates from the target value thereof, which is no longer within the specified tolerance, in a process step preceding the determination of the surface quality, a manufacturing parameter is controlled in such a way that the actual value of the surface quality for subsequently produced components is again within the specified tolerance. Suitable fields of application arise here in particular for metal components that undergo different process steps in the context of series production, since the surface condition of the components for subordinate process steps is often of great importance for the quality and functionality of the end product. For example, when producing metal strips such as hot-dip coated steel strips, the metal surfaces are subjected to wet-chemical passivation, the performance of which requires as homogeneous a thin layer of the passivating, mostly inorganic, coating as possible. The method according to the invention is now ideally suited for the determination of the surface properties of the strip passivation insofar as a pyroelectric sensor is fixed in place relative to the conveyor belt of the metal strip that then continuously passes the sensor and electronically quasi-continuously detects the detected irradiance and forwards the irradiance as a data packet to a data processing system, which, in the event of deviations outside the tolerance, provides for an adjustment of the wet film application of the passivating agent or the position of the application rollers relative to the strip surface, so that a sufficient amount of passivation is now implemented on all regions of the strip.

In a variant preferred in connection with the use of the two methods according to the invention in the context of the series production of components comprising a large number of process steps, the information regarding the degree of deviation of the actual value of the surface quality of each component in the series from the target value at a specified production stage is supplied to at least one controller. The at least one controller outputs a manipulated variable, that is uniquely dependent on the degree of deviation, for a process parameter in a process step which precedes the detection step for detection of the actual value of the surface quality, the manipulated variable bringing about such a change in the value of the process parameter that the actual value of the surface quality of the component at the specified production stage that goes through the preceding process step with changed process parameters, compared to the actual value of the component of which the deviation from the target value is the cause of the manipulated variable, is closer to the target value of the surface quality.

In general, therefore, uses of the two methods according to the invention for determining differences in the surface properties are preferred which relate to the series production of components with a large number of process steps being performed and/or in which after the monitoring and optional adjusting of the surface quality, the preferably metal component is supplied to a further manufacturing process which comprises the integral connection, preferably by bonding, to the same or another component, and the application of a coating or a material.

As already explained, metal components are particularly suitable for the use according to the invention, which components in turn are preferably selected from a strip, sheet, pipe, profile, cast part, container, a (beverage) can or an (automobile) body or an (automobile) body part.

In a further aspect, the present invention relates to a device for adjusting the surface properties in the series production of components and, for example, for ensuring a consistent surface quality of the finished components, comprising i) a measuring device suitable for carrying out a method as disclosed herein, the measuring device comprising:
   a) a receiver surface for measuring infrared radiation and suitable for outputting a physical variable proportional to the irradiance detected on the receiver surface, preferably an electrical voltage signal proportional to the irradiance;
   b) a transport device which is intended to move the individual components of the series past the receiver surface of the measuring device in such a way that it is possible to determine the irradiance on the receiver surface as infrared radiation emitted by the component at at least one defined position relative to the component; and
   c) optionally a temperature control unit suitable for setting a substantially equal temperature of the component at the time it is guided past the receiver surface of the measuring device, comprising a heating and/or cooling element and optionally a temperature sensor;

ii) a controller which is designed to compare the physical measured variable issued by the measuring device and proportional to the irradiance detected on the receiver surface as the actual value of the surface properties with a reference value of the same physical measured variable as the target value of the surface properties and to output a one-to-one control variable for the deviation from the actual value and the target value to an adjusting device; and iii) an adjusting device which is suitable to convert the control variable into a manipulated variable for a process parameter in a process step preceding the detection of the actual value of the surface quality, with the measuring device, controller and adjusting device forming a control loop to minimize the deviation between the actual value and the target value of the surface properties.

Such a device makes it possible to adjust the surface properties of the components to desired surface properties at a certain production stage during series production of components, without the need for costly analysis of the chemical composition of the surface properties and without the need to stop series production for such a chemical analysis. In an operating trial, a surface treatment, for example a wet-chemical passivation or cleaning stage, can be set up with generally applicable practical knowledge and the production system can be adjusted to a reference value for the irradiance of the infrared radiation, which is measured and referenced on a "target component" on the system, as the target value of the surface properties. After adapting and optimizing the manipulated variables, it is possible to switch to production operation after a short time. The adaptation and optimization of the manipulated variables as well as the monitoring of the surface properties can preferably take place by means of a data processing system after conversion of the analog physical variables belonging to the relevant manipulated variables and measurement signals into digital data. Advantageously, the signals as well as the control and manipulated variables output by the measuring device, the controller and the adjusting device are picked up from an interface and electronically detected as data in digital form in order to be able to control and monitor the control loop in a data processing system. In this context, it is also advantageous if the interface comprises a telemetry module in order to provide an option to read out the data detected by the interface at another location and/or to provide an option for the data to be transmitted to and/or from another location and, from this other location, receive data packets to influence the control loop, e.g., on the controller and the output manipulated variable.

What is claimed is:

1. A method for detecting differences in surface properties of at least two components made from the same metal substrate material selected from tin, titanium, aluminum, magnesium, iron, zinc, chromium, nickel or copper and alloys thereof, in which method infrared radiation emitted by the components at a certain temperature of the components is detected as irradiance at a specified receiver surface at at least one different position relative to each individual component, the irradiance emitted by each individual component being detected in such a way that the distance of three fixed points on the receiver surface from the individual component surface along surface normals thereof at the at least one position of the receiver surface relative to the individual component, as well as the certain temperature of each individual component, remains substantially unchanged, differences in the irradiance of the components detected on the receiver surface then being equated with differences in the surface properties of the components; wherein the irradiance is detected over a wavelength range or at a wavelength which is in a range of from $1.0 \times 10^{-6}$ to $1.0 \times 10^{-4}$ m; and the at least two components comprise a coating or a wet film, which is substantially transparent in the wavelength range or at the wavelength in said range.

2. A method for detecting differences in surface properties of a component surface comprising steps of: detecting infrared radiation emitted by a component at a certain temperature of the component as detected irradiance at a specified receiver surface at at least two different positions relative to the component, carrying out positioning such that distance of three fixed points on the receiver surface from the component surface remains substantially unchanged along surface normals thereof for each position of the receiver surface, position dependency of the detected irradiance being equated with differences in the surface properties of the component wherein the component or components have a thermal conductivity of at least 1 $Wm^{-1}K^{-1}$.

3. The method according to claim 2, wherein the component or components are made of a metal material selected from tin, titanium, aluminum, magnesium, iron, zinc, chromium, nickel or copper and the alloys thereof.

4. The method according to claim 2, further comprising steps of monitoring, and optionally adjusting, surface quality of a component originating from a manufacturing process.

5. The method of claim 4, wherein an actual value of the surface quality equating to the irradiance detected from the component, is compared with an identically detected irradiance, as a target value of the surface quality, of an identical component which has a desired surface quality, and optionally the component is checked with regard to a predetermined tolerance for degree of deviation thereof from one another and/or classified qualitatively.

6. The method of claim 5, wherein the method is part of a series production of components comprising a large number of process steps, wherein information regarding the deviation of the actual value of the surface quality of each component in the series from the target value at a specified production stage is supplied to at least one controller; wherein the at least one controller outputs a manipulated variable, which is dependent on the degree of deviation, for a process parameter in a process step preceding the detecting step of the actual value of the surface quality, the manipulated variable changing the process parameter such that the actual value of the surface quality of the component at the specified production stage that goes through the preceding process step with changed process parameter, compared to the actual value of the component of which the deviation from the target value is a cause of the manipulated variable, is closer to the target value of the surface quality.

7. The method of claim 4, further comprising, after the monitoring and optional adjusting of the surface quality, supplying the component to a further manufacturing process which comprises integrally connecting the supplied component to a surface, and/or application of a coating or a material.

8. The method of claim 4, wherein the component is metal and is selected from a strip, a sheet, a pipe, a profile, a cast part, a container, a beverage can, a vehicle part or a vehicle body assembly.

9. A device for adjusting surface properties in the series production of components, comprising:
  i) a measuring device capable of detecting differences in surface properties of a component according to the method of claim 2, comprising
    a) a receiver surface for measuring infrared radiation and outputting a physical variable, optionally as an electrical voltage signal, which is proportional to irradiance detected on the receiver surface;
    b) a transport device to move the component past the receiver surface of the measuring device to thereby determine the irradiance on the receiver surface as infrared radiation emitted by the component at at least one defined position relative to the component; and
    c) optionally a temperature control unit suitable for setting a substantially equal temperature of the component at the time it is guided past the receiver surface of the measuring device, comprising a heating and/or cooling element and optionally a temperature sensor;
  ii) a controller that compares the physical variable outputted by the measuring device, which is proportional to the irradiance detected on the receiver surface, as the actual value of the surface properties to a reference value of the same physical variable as the target value of the surface properties; and outputs a one-to-one control variable for the deviation from the actual value and the target value; and
  iii) an adjusting device that receives and converts the outputted one-to-one control variable into a manipulated variable for a process parameter in a process step preceding the detection of the actual value of the surface quality;

wherein the measuring device, controller and adjusting device form a control loop to minimize the deviation between the actual value and the target value of the surface properties.

10. The method according to claim 2, further comprising converting the position dependency of the detected irradiance into a location dependency on the component surface by projection of the location of the geometric center of gravity of the receiver surface along the surface normals onto the surface of the component being equated with the location of the detected irradiance.

11. The method according to claim 2, wherein the position dependency or location dependency of the detected irradiance takes place by means of false color imaging.

12. The method according to claim 2, wherein the receiver surface for detecting the irradiance is made of a pyroelectric material.

13. The method according to claim 2, wherein the irradiance is detected over a wavelength range or at a wavelength which is in a range of from $1.0 \times 10^{-6}$ to $1.0 \times 10^{-4}$ m.

14. The method according to claim 13, wherein the range is from $3.0 \times 10^{-6}$ to $2.0 \times 10^{-5}$ m.

15. The method according to claim 13, wherein the component comprises a coating or a wet film, which is substantially transparent in the wavelength range or at the wavelength in said range.

16. The method according to claim 2, wherein temperature of the component or components is determined by means of a temperature sensor, the component optionally being connected to a heat source or heat sink for setting a specific temperature.

17. The method according to claim 1, wherein the irradiance is detected over a wavelength range or at a wavelength which is in the range of from $3.0 \times 10^{-6}$ to $2.0 \times 10^{-5}$ m.

18. The method according to claim 1, wherein temperature of the components is determined by means of a temperature sensor, the components optionally being connected to a heat source or heat sink for setting a specific temperature.

19. The method of claim 1, wherein an actual value of the surface quality equating to the irradiance detected from the components, is compared with an identically detected irradiance, as a target value of the surface quality, of an identical component which has a desired surface quality, and optionally the component is checked with regard to a predetermined tolerance for degree of deviation thereof from one another and/or classified qualitatively.

20. The method according to claim 1, further comprising steps of monitoring and adjusting surface quality of the components originating from a manufacturing process.

21. The method of claim 20, further comprising, after the monitoring and adjusting of the surface quality, supplying the components to a further manufacturing process which comprises integrally connecting the supplied component to a surface.

22. The method according to claim 1, wherein the components made from the same metal substrate material are selected from strips, sheets, pipes, profiles, cast parts, containers, beverage cans, vehicle parts or vehicle body assemblies.

* * * * *